US010616900B2

(12) United States Patent
Jetcheva et al.

(10) Patent No.: US 10,616,900 B2
(45) Date of Patent: *Apr. 7, 2020

(54) CHANNEL ASSIGNMENT FOR WIRELESS ACCESS NETWORKS

(71) Applicant: FIRETIDE, INC., Campbell, CA (US)

(72) Inventors: Jorjeta Jetcheva, Los Gatos, CA (US); Ravi Prakash, Los Gatos, CA (US); Vinay Gupta, Kamataka (IN); Sachin Kanodia, San Jose, CA (US); Mohan Natarajan, San Ramon, CA (US)

(73) Assignee: Firetide, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/003,442

(22) Filed: Jun. 8, 2018

(65) Prior Publication Data
US 2019/0141715 A1 May 9, 2019

Related U.S. Application Data

(63) Continuation of application No. 14/475,827, filed on Sep. 3, 2014, now Pat. No. 9,999,058, which is a
(Continued)

(30) Foreign Application Priority Data

Jan. 24, 2008 (IN) .............................. 203/DEL/2008

(51) Int. Cl.
*H04W 4/00* (2018.01)
*H04W 72/08* (2009.01)
(Continued)

(52) U.S. Cl.
CPC ........... *H04W 72/082* (2013.01); *H04L 41/12* (2013.01); *H04W 72/0426* (2013.01);
(Continued)

(58) Field of Classification Search
None
See application file for complete search history.

(56) References Cited

U.S. PATENT DOCUMENTS 5,603,082 A * 2/1997 Hamabe ................ H04W 16/10
455/450
5,987,062 A * 11/1999 Engwer .............. H04B 17/0085
370/251
(Continued)

*Primary Examiner* — Bunjob Jaroenchonwanit
(74) *Attorney, Agent, or Firm* — PatentVentures; Bennett Smith; Korbin Van Dyke

(57) ABSTRACT

Channel assignment for wireless access networks is directed toward improved overall communication capability of the networks. A network is formed of wireless access points (APs) coupled via wired (and/or wireless) links and enabled to communicate with clients via radio channels of each of the APs. Local information is collected at each of the APs and processed to determine channel assignments according to a Neighbor Impact Metric (NIM) that accounts for one-hop and two-hop neighbors as well as neighbors not part of the network. Optionally, the NIM accounts for traffic load on the APs. The channel assignments are determined either on a centralized resource (such as a server or one of the APs) or via a distributed scheme across the APs. The local information includes how busy a channel is and local operating conditions such as error rate and interference levels.

20 Claims, 4 Drawing Sheets

Related U.S. Application Data continuation of application No. 12/864,244, filed as application No. PCT/US2009/030880 on Jan. 13, 2009, now Pat. No. 8,830,921.

(51) Int. Cl.
| | | |
|---|---|---|
| *H04W 72/04* | (2009.01) | |
| *H04L 12/24* | (2006.01) | |
| *H04W 72/12* | (2009.01) | |
| *H04W 88/08* | (2009.01) | |

(52) U.S. Cl.
CPC ... *H04W 72/0433* (2013.01); *H04W 72/0486* (2013.01); *H04W 72/121* (2013.01); *H04W 88/08* (2013.01)

(56) References Cited

U.S. PATENT DOCUMENTS

| | | | | |
|---|---|---|---|---|
| 6,970,927 B1* | 11/2005 | Stewart | ......... | H04W 48/02 370/431 |
| 7,653,393 B2* | 1/2010 | Kim | ......... | H04W 36/0061 370/331 |
| 8,320,967 B2* | 11/2012 | Nammi | ......... | H04B 7/063 370/328 |
| 8,498,356 B2* | 7/2013 | Clerckx | ......... | H04B 7/0639 370/210 |
| 8,830,921 B2* | 9/2014 | Jetcheva | ......... | H04W 72/0486 370/329 |
| 9,999,058 B2* | 6/2018 | Jetcheva | ......... | H04W 72/0486 |
| 2002/0071446 A1* | 6/2002 | Khafizov | ......... | H04W 72/1252 370/442 |
| 2002/0196752 A1* | 12/2002 | Attar | ......... | H04L 1/20 370/331 |
| 2003/0072294 A1* | 4/2003 | Wei | ......... | H04W 24/00 370/345 |
| 2003/0076796 A1* | 4/2003 | Kondo | ......... | H04B 1/7103 370/332 |
| 2003/0119527 A1* | 6/2003 | Labun | ......... | H04L 12/5692 455/456.1 |
| 2004/0157613 A1* | 8/2004 | Steer | ......... | H04W 16/10 455/446 |
| 2004/0203828 A1* | 10/2004 | Mirchandani | ......... | H04W 16/02 455/452.1 |
| 2004/0215750 A1* | 10/2004 | Stilp | ......... | G06K 7/0008 709/220 |
| 2005/0003827 A1* | 1/2005 | Whelan | ......... | H04W 16/10 455/454 |
| 2005/0053046 A1* | 3/2005 | Wang | ......... | H04L 12/4645 370/338 |
| 2005/0122231 A1* | 6/2005 | Varaiya | ......... | H04W 40/22 340/870.01 |
| 2005/0195739 A1* | 9/2005 | Grover | ......... | H04J 3/14 370/225 |
| 2006/0046709 A1* | 3/2006 | Krumm | ......... | H04N 21/4126 455/422.1 |
| 2006/0072502 A1* | 4/2006 | Crandall | ......... | H04W 72/02 370/329 |
| 2006/0104232 A1* | 5/2006 | Gidwani | ......... | H04W 28/18 370/328 |
| 2006/0133320 A1* | 6/2006 | Kim | ......... | H04W 36/0055 370/331 |
| 2007/0047492 A1* | 3/2007 | Kim | ......... | H04W 36/00837 370/331 |
| 2007/0264938 A1* | 11/2007 | Srinivasan | ......... | H04W 24/00 455/67.11 |
| 2008/0037469 A1* | 2/2008 | Hamilton | ......... | H04W 36/08 370/331 |
| 2008/0062886 A1* | 3/2008 | Tang | ......... | H04L 47/70 370/252 |
| 2008/0069059 A1* | 3/2008 | Yagyu | ......... | H04W 72/08 370/336 |
| 2010/0118809 A1* | 5/2010 | Cha | ......... | H04W 16/10 370/329 |
| 2010/0280890 A1* | 11/2010 | Park | ......... | G06Q 30/0241 705/14.4 |
| 2011/0051619 A1* | 3/2011 | Gong | ......... | H04W 16/10 370/252 |
| 2014/0036788 A1* | 2/2014 | Ganu | ......... | H04W 16/10 370/329 |
| 2014/0105122 A1* | 4/2014 | Zhang | ......... | H04W 72/042 370/329 |
| 2014/0302796 A1* | 10/2014 | Gormley | ......... | H04W 24/08 455/67.13 |

* cited by examiner

CHANNEL ASSIGNMENT FOR WIRELESS ACCESS NETWORKS

CROSS REFERENCE TO RELATED APPLICATIONS

Priority benefit claims for this application are made in the accompanying Application Data Sheet. To the extent permitted by the type of the instant application, this application incorporates by reference for all purposes the following applications, all commonly owned with the instant application at the time the invention was made:

U.S. patent application Ser. No. 14/475,827, filed Sep. 3, 2014, now U.S. Pat. No. 9,999,058, entitled CHANNEL ASSIGNMENT FOR WIRELESS ACCESS NETWORKS;

U.S. patent application Ser. No. 12/864,244, filed Nov. 18, 2010, now U.S. Pat. No. 8,830,921, entitled CHANNEL ASSIGNMENT FOR WIRELESS ACCESS NETWORKS;

International Patent Application No. PCT/US2009/030880, filed Jan. 13, 2009, entitled CHANNEL ASSIGNMENT FOR WIRELESS ACCESS NETWORKS; and Indian Standard Patent Application No. 203/DEL/2008, filed Jan. 24, 2008, entitled CHANNEL ASSIGNMENT FOR WIRELESS ACCESS NETWORKS.

BACKGROUND

Field

Advancements in wireless access networks are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

| Ref. Symbol | Element Name |
|---|---|
| 100-1 | Access Node 1 |
| 100-2 | Access Node 2 |
| 100-3 | Access Node 3 |
| 100-4 | Access Node 4 |
| 100-5 | Access Node 5 |
| 200-1 | Client Link 1 |
| 200-2 | Client Link 2 |
| 210 | Ongoing Channel Assignment Process |
| 220 | Load Balancing on APs Process |
| 230 | AP Neighbor Info + Busy Channel Assessment Process |
| 240 | Client and Traffic Load Statistics Process |
| 250 | Transmit Power Control Process |
| 260 | Initial Channel Assignment Process |
| 300-1 | Central Server Link 1 |
| 300-2 | Central Server Link 2 |
| 300-3 | Central Server Link 3 |
| 300-4 | Central Server Link 4 |
| 300-5 | Central Server Link 5 |
| 301.1 | Memory Bank 1 |
| 301.2 | Memory Bank 2 |
| 302 | DRAM Memory Interface |
| 303 | FLASH |
| 304 | EEPROM |
| 305 | Processor |
| 306 | Ethernet Interface |
| 307 | Ethernet Ports |
| 306 | Ethernet Interface |
| 308 | PCI Expansion Bus |
| 309 | Wireless Interface |
| 309-A | Wireless Interface A |
| 309-N | Wireless Interface N |
| 400-1 | Internet Access Link 1 |
| 400-2 | Internet Access Link 2 |
| 401 | Network Management System Manager |
| 402 | Network Interface Manager |
| 403 | Fault, Configuration, Accounting, Performance, and Security Manager |
| 410 | Kernel Interface |
| 411 | Routing and Transport Protocols Layer |
| 412 | Layer-2 Abstraction Layer |
| 413 | Flash File System Module |
| 414 | Ethernet Driver |
| 415 | Radio Driver |
| 416 | Flash Driver |
| 420 | Collective Hardware Interfaces |
| 423 | FLASH hardware element |
| 500 | Central Server |
| 600-1 | Client Device 1 |
| 600-2 | Client Device 2 |
| 800 | Internet |
| 1000 | Network |

DETAILED DESCRIPTION

Figure 1:
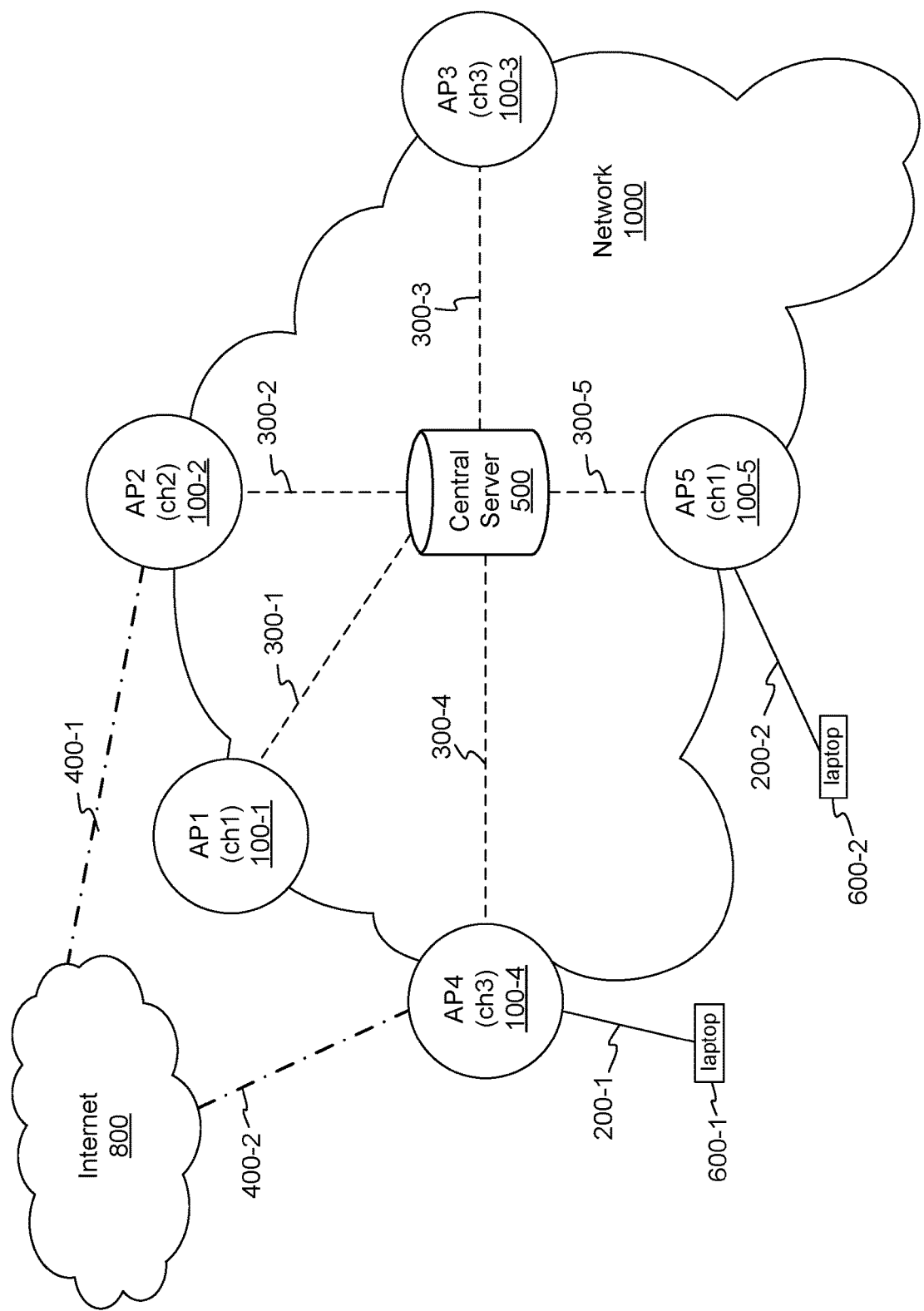
FIG. 1 illustrates selected details and operating context of an embodiment of wireless access points that are enabled to operate in a network according to assignments of channels.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| AP | Access Point |
| CDMA | Code Division Multiple Access |
| DRAM | Dynamic read/write Random Access Memory |
| EEPROM | Electrically-Erasable Programmable Read-Only Memory |
| FCAPS | Fault, Configuration, Accounting, Performance, and Security |
| GPS | Global Positioning System |
| GSM | Global System for Mobile communications |
| NIM | Neighbor Impact Metric |
| NMS | Network Management System |
| PDA | Personal Digital Assistant |
| TCP | Transmission Control Protocol |
| TDMA | Time Division Multiple Access |
| UDP | User Datagram Protocol |
| WLAN | Wireless Local Area Network |

Terminology

An example of a neighbor AP is an AP that, with respect to another AP, transmits packets that are decodable by the other AP, such that the two APs are within transmission/reception range of each other. An example of an internal neighbor AP, with respect to another AP of a network, is a neighbor AP of the other AP that is operating (or enabled for participating) in the network. The operating or participating are via any combination of wired or wireless links that enable communication with the Internet and/or one or more other APs of the network. An example of an external neighbor AP, with respect to an AP of a network, is a neighbor AP of the AP that is not operating (or not enabled for participating) in the network. Internal neighbor APs are subject to channel assignments for the network, and operate cooperatively with respect to constraints the network attempts to impose. In contrast, external neighbor APs are not subject to channel assignments for the network, and are not guaranteed to cooperate with constraints the network attempts to impose. In some situations, external neighbors operate with different protocols than internal neighbors. An example of a one-hop (internal) neighbor AP, with respect to a reference AP, is an AP that is within one wireless hop of the reference AP. The one-hop (internal) neighbor AP and the reference AP operate (or are enabled to participate) in the same network. An example of a two-hop (internal) neighbor AP, with respect to a reference AP, is an AP that is within two wireless hops of the reference AP. The two-hop (internal) neighbor AP, the reference AP, and the AP forwarding between the two wireless hops all operate (or are enabled to participate) in the same network. Elsewhere herein, the term neighbor (AP), unless further qualified explicitly or by context, refers to a neighbor AP of the aforementioned one-hop (internal) neighbor AP type.

An example of interference is when a transmission from a first source (such as from an internal or external AP, or from a non-communication source such as a microwave oven) reduces communication effectiveness of a transmission from a second source (such as an AP of a network). APs that are close enough to each other to interfere with each other are examples of APs that are within interference range of each other. In some embodiments, an interference range of an AP is approximately equal to twice a transmission range of the AP. APs that are one-hop (internal) neighbors (and, in some situations, two-hop neighbors) with respect to a particular AP, are sources of interference for the particular AP, such as when the neighbors are within interference range of the particular AP. In some situations, APs that are not neighbors of a particular AP are also sources of interference for the particular AP, such as when the non-neighbors are within interference range of the particular AP but are not within transmission range. Thus, according to operating environment, an AP is interfered with by one or more of one-hop and two-hop neighbor APs, as well as non-neighbor APs and non-AP emission sources.

Wireless access to network services and the Internet is, in some usage scenarios, provided via a network of wireless access devices. Each of the wireless access devices covers a respective geographic area (referred to as a "cell") where coverage is desired. Example network technologies include cellular (such as CDMA, TDMA or GSM) and WLANs (such as 802.11 compatible networks). Example wireless access devices include base stations (such as used in cellular networks) and APs (such as used in WLANs). Hereinafter the term 'AP' is used for brevity of description to refer to wireless access devices in general, including cellular network base stations and WLAN APs.

Each AP enables connections and/or associations of wireless devices within the respective cell. All of the cells taken together represent a coverage area of the network. Users or customers connect to the network via various devices having wireless communication capability that is compatible with one or more of the APs, such as laptop or notebook computers, PDAs, phones, and other mobile or portable devices. The connecting devices are referred to as clients with respect to the network. The APs are interconnected via any combination of wired and wireless links, and optionally interact with a server (such as a centralized controller). The server optionally controls some aspects of behavior and/or configuration of one or more of the APs.

Deployment of a wireless access network, in some usage scenarios, balances conflicting goals, such as overlap in cells of different APs and frequency diversity. Overlap in cells enables setting up an association with an AP in a new cell that a roaming client is moving to, while the roaming client continues to use services and/or connectivity provided by a current AP in a current cell. As overlap of cells increases, more time is available for a roaming client to change association from a current to a new AP (note that as a roaming client moves more quickly, less time is available to change associations). Frequency diversity enables APs and other wireless devices to be geographically close and operate with reduced interference between each other, via links of different frequencies and/or channels. The diverse frequencies and channels enable multiple simultaneous communications.

Thus assigning (e.g. allocating or distributing) frequencies and/or channels across APs to reduce or minimize interference beneficially enables more efficient use of the frequencies and/or channels. In some usage scenarios, such as scenarios associated with certain frequency bands, as few as three channels are available for assignment. In some usage scenarios, such as scenarios associated with an unlicensed band, devices "external" to the network (e.g. devices that are not APs and are not clients of the network) interfere with communication in the network. Examples of external devices include elements of neighboring networks (such as APs of a nearby network) and non-network devices (such as microwave ovens and cordless phones).

Network efficiency is improved, in some usage scenarios and/or embodiments, when channel assignment takes into consideration various factors. The factors include how many channels are available for allocation, as well as existence and characteristics of interference present on various channels. For example, identification of a time characteristic of an external interference source enables more efficient channel assignment, such as not using a particular channel to avoid a permanent interference source, or using a particular channel in view of a transient interference source.

Various embodiments described herein enable improved efficiency of a network having a set of APs, each AP being configured with a respective transmit power level and a respective assigned set of channels. The transmit power level is determined based on coverage requirements. The assigned channels are determined to maximize overall performance of the APs operating as a set in the network; e.g. to maximize communication performance of the network as a whole.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
within an access point enabled to participate in a network, evaluating communication conditions local to the access point;
operating the access point in accordance with a channel assignment that is a function of the evaluating; and
wherein the channel assignment is in accordance with optimizing overall communication performance of the network at a higher priority than optimizing communication performance of the access point.

EC2) The method of EC1, wherein the access point is enabled to communicate via one or more channels, and the evaluating comprises computing availability of the channels with respect to the access point.

EC3) The method of EC2, wherein the computing availability comprises the access point determining a fraction of time each of the channels is busy.

EC4) The method of EC2, wherein the computing availability comprises the access point recognizing reception errors.

EC5) The method of EC4, wherein the recognizing comprises classifying one or more of interference, weak signal strength, unknown encoding, non-information, and noise as one of the reception errors.

EC6) The method of EC2, wherein the computing availability comprises the access point recognizing transmissions from devices not participating in the network as interference.

EC7) The method of EC2, wherein the computing availability comprises the access point recognizing emissions from non-networking devices as interference.

EC8) The method of EC2, wherein the computing availability determines that a particular one of the channels is not usable by the access point, and the channel assignment has no assignment of the particular channel to the access point.

EC9) The method of EC8, further comprising operating the access point with another channel assignment that has an assignment of the particular channel when the particular channel is usable.

EC10) The method of EC1, wherein the evaluating comprises determining a number of neighbor access points the access point is able to communicate with in a single wireless hop.

EC11) The method of EC10, wherein the determining comprises passively listening and recording information about other access points of the network that are within communication range of the access point.

EC12) The method of EC11, wherein the passively listening comprises receiving control and/or data traffic from one or more of the other access points.

EC13) The method of EC11, wherein the information comprises one or more of an address and a signal strength.

EC14) The method of EC10, wherein the determining comprises actively scanning and recording information about other access points of the network that are within communication range of the access point.

EC15) The method of EC14, wherein the actively scanning comprises sending one or more probe packets to solicit one or more responses from one or more of the other access points.

EC16) The method of EC14, wherein the information comprises one or more of an address and a signal strength.

EC17) The method of EC10, wherein the evaluating further comprises classifying the neighbor access points as enabled to participate in the network or as not enabled to participate in the network, and the channel assignment is further in accordance with the classifying.

EC18) The method of EC10, further comprising spanning the single wireless hop via one or more radios of the access point.

EC19) The method of EC1, wherein the evaluating comprises determining a communication load of the access point.

EC20) The method of EC19, wherein the determining comprises recording how many clients are served by the access point during one or more time intervals.

EC21) The method of EC19, wherein the determining comprises recording how much traffic clients that are served by the access point send and/or receive via the access point during one or more time intervals.

EC22) The method of EC19, wherein the determining comprises recording how many neighbor access points that the access point has during one or more time intervals.

EC23) The method of EC19, wherein the determining comprises recording how much traffic that neighbor access points of the access point have during one or more time intervals.

EC24) The method of EC1, wherein the access point, one or more neighbor access points, and zero or more non-neighbor access points are enabled to participate in the network.

EC25) The method of EC24, wherein the overall communication performance of the network is a function of the communication performance of the access point in combination with communication performance of the neighbor and the non-neighbor access points.

EC26) The method of EC1, wherein the overall communication performance of the network is quantifiable according to bandwidth, latency, or both.

EC27) The method of EC1, wherein the communication performance of the access point is quantifiable according to bandwidth, latency, or both.

EC28) The method of EC1, further comprising determining the channel assignment in response to one or more of a request and an event.

EC29) The method of EC1, further comprising determining the channel assignment at least in part via the access point.

EC30) The method of EC1, further comprising determining the channel assignment at least in part via a centralized resource.

EC31) The method of EC30, wherein the centralized resource is all or any portion of the access point.

EC32) The method of EC30, wherein the centralized resource is all or any portion of a server.

EC33) The method of EC1, wherein the channel assignment is a current channel assignment and is further in accordance with reducing changes between a previous channel assignment and the current channel assignment.

EC34) The method of EC1, wherein the channel assignment is preferential to the access point when the access point is experiencing a relatively higher communication load than other access points enabled to participate in the network.

EC35) The method of EC1, wherein the channel assignment is in accordance with one or more fixed channel assignments.

EC36) A method comprising:
  receiving communication condition information from each of a plurality of access points enabled to participate in a network;
  determining assignments of channels to each of the access points based at least in part on the communication condition information;
  communicating the assignments of channels to the access points; and
  wherein the assignments of channels are in accordance with optimizing overall communication performance of the network at a higher priority than optimizing communication performance of any one of the access points individually.

EC37) The method of EC36, wherein the communication condition information from a particular one of the access points comprises availability of channels with respect to the particular access point.

EC38) The method of EC37, wherein the availability comprises a fraction of time each of the channels is not busy.

EC39) The method of EC37, wherein the availability comprises an indication that one or more of the channels is not usable by the particular access point, and the determining avoids assigning the unusable channels to the particular access point.

EC40) The method of EC39, wherein the determining, after a period of time has elapsed, negates the avoiding and considers the unusable channels as eligible to be assigned to the particular access point.

EC41) The method of EC36, wherein the communication condition information from a particular one of the access points comprises a count of neighbor access points the particular access point is able to communicate with in a single wireless hop.

EC42) The method of EC41, further comprising spanning the single wireless hop via one or more radios of the particular access point.

EC43) The method of EC36, wherein the communication condition information from a particular one of the access points comprises a communication load of the particular access point.

EC44) The method of EC36, wherein the communication condition information from a particular one of the access points comprises a count of clients served by the particular access point.

EC45) The method of EC36, wherein the communication condition information from a particular one of the access points comprises a quantification of traffic that clients served by the particular access point send and/or receive via the particular access point.

EC46) The method of EC36, wherein the communication condition information from a particular one of the access points comprises a count of how many other ones of the access points are neighbors of the particular access point.

EC47) The method of EC36, wherein the communication condition information from a particular one of the access points comprises a quantification of traffic of other ones of the access points that are neighbors of the particular access point.

EC48) The method of EC36, wherein the communication condition information from a particular one of the access points comprises information relating to one or more time intervals.

EC49) The method of EC36, wherein the overall communication performance of the network is quantifiable according to bandwidth, latency, or both.

EC50) The method of EC36, wherein the communication performance of at least one of the access points is quantifiable according to bandwidth, latency, or both.

EC51) The method of EC36, wherein the determining is in response to a request originating from a network administrator.

EC52) The method of EC36, wherein the determining is in response to an event.

EC53) The method of EC52, wherein the event comprises one or more of a change in an aspect of the communication condition information,
one of the access points becoming no longer enabled to participate in the network, and
a new access point becoming enabled to participate in the network.

EC54) The method of EC36, wherein at least a portion of the determining is via one or more of the access points.

EC55) The method of EC36, wherein at least a portion of the determining is via a centralized resource.

EC56) The method of EC55, wherein the centralized resource is all or any portion of one of the access points.

EC57) The method of EC55, wherein the centralized resource is all or any portion of a server.

EC58) The method of EC36, wherein the assignment of channels to a particular one of the access points is a current assignment of channels, and the determining is in accordance with reducing changes between a previous assignment of channels to the particular access point and the current assignment of channels.

EC59) The method of EC36, wherein the determining is preferential to a particular one of the access points experiencing relatively higher communication load than other ones of the access points.

EC60) The method of EC36, wherein the determining is in accordance with one or more fixed channel assignments.

EC61) The method of EC36, further comprising determining at least a portion of the communication condition information via at least one of the access points.

EC62) A method comprising:
computing topological metrics based at least in part on communication topology of a plurality of access points enabled to participate in a network; and
determining, based at least in part on the topological metrics, assignments of channels to each of the access points.

EC63) The method of EC62, wherein the determining is further based at least in part on a respective channel preference list provided by each of the access points.

EC64) The method of EC63, wherein the determining uses the channel preference list of a particular one of the access points to break a tie in assigning a portion of the assignment of channels of the particular access point.

EC65) The method of EC63, wherein the channel preference list of a particular one of the access points comprises a sorted list of ones of the channels the particular access point is enabled to communicate via, and the sorting is according to channel load with respect to the particular access point.

EC66) The method of EC63, wherein the respective channel preference lists are provided repeatedly over time.

EC67) The method of EC62, wherein the assignments of channels are in accordance with providing overall communication capacity of the network at a higher priority than providing communication capacity of any one of the access points individually.

EC68) The method of EC62, wherein the topological metrics are per each of the access points.

EC69) The method of EC62, wherein the topological metrics are per each of the channels.

EC70) The method of EC62, wherein the topological metrics are per each of the access points and each of ones of the channels each respective one of the access points is enabled to communicate via.

EC71) The method of EC62, wherein the topological metrics are weighted sums of a plurality of sub-metrics.

EC72) The method of EC71, wherein one of the sub-metrics is an average number of access point one-hop neighbors.

EC73) The method of EC72, wherein the average number is computed by counting each of the access point one-hop neighbors being averaged as one.

EC74) The method of EC72, wherein the average number is computed by counting each of the access point one-hop neighbors being averaged as a weighted sum of one or more of a constant value, a number of clients, and a traffic load.

EC75) The method of EC71, wherein one of the sub-metrics is an average of access point two-hop neighbors.

EC76) The method of EC75, wherein the average number is computed by counting each of the access point two-hop neighbors being averaged as one.

EC77) The method of EC75, wherein the average number is computed by counting each of the access point two-hop neighbors being averaged as a weighted sum of one or more of a constant value, a number of clients, and a traffic load.

EC78) The method of EC71, wherein one of the sub-metrics is an average number of access point external neighbors.

EC79) The method of EC71, wherein at least a first one of the sub-metrics is with respect to access point internal neighbors, at least a second one of the sub-metrics is with respect to access point external neighbors, and the determining weights the first sub-metric higher than the second sub-metric.

EC80) The method of EC62, wherein the computing and the determining are performed initially.

EC81) The method of EC62, wherein the computing and the determining are performed repeatedly over time.

EC82) A method comprising:
evaluating communication performance of a network of access points assuming proposed assignments of channels to the access points;
determining a communication performance metric at least in part by computing an average number of access point neighbors of each of the access points; and
wherein the evaluating is based at least in part on the determining.

EC83) The method of EC82, wherein the average is a weighted average of one or more of
an average of access point one-hop neighbors, an average of access point two-hop neighbors, and
an average of access point external neighbors.

EC84) The method of EC82, wherein the neighbors are one-hop neighbors.

EC85) The method of EC82, wherein the neighbors are two-hop neighbors.

EC86) The method of EC82, wherein the neighbors are external neighbors.

EC87) The method of EC82, wherein the determining is based at least in part on at least one channel preference list from at least one of the access points.

EC88) The method of EC82, further comprising comparing the communication performance of the network to communication performance of another network, at least in part by normalizing the communication performances to respective numbers of access points in each respective network.

EC89) The method of EC82, further comprising comparing the communication performance of the network to communication performance of another network, at least in part by normalizing the communication performances to respective numbers of channels available to assign in each respective network.

EC90) The method of EC82, further comprising comparing the communication performance of the network to another communication performance of the network assuming another proposed assignment of channels to the access points.

EC91) The method of EC82, further comprising operating the network.

EC92) The method of EC91, wherein the operating is in accordance with the proposed assignments of channels.

EC93) The method of EC91, wherein the operating is in accordance with previous assignments of channels, and the evaluating is based at least in part on communication statistics gathered during at least a portion of the operating.

EC94) The method of EC82, wherein the average is a weighted average computed in accordance with a number of clients.

EC95) The method of EC82, wherein the average is a weighted average computed in accordance with traffic load.

EC96) A system comprising:
means for computing a neighbor impact metric in a network of access points; and
means for assigning channels to the access points, the means for assigning channels being based at least in part on results of the means for computing.

EC97) The system of EC96, wherein the means for assigning channels is further based at least in part on respective channel preference lists from each of the access points.

EC98) A system comprising:
means for evaluating communication conditions local to an access point;
means for operating the access point in a network in accordance with a channel assignment that is a function of the means for evaluating; and
wherein the channel assignment is directed to prioritize overall communication performance of the network over communication performance of the access point.

EC99) A system comprising:
an access point enabled to operate in a network;
a centralized resource; and
wherein the centralized resource is enabled to receive communication condition information from the access point and to determine a channel assignment of the access point that is directed to prioritize overall communication performance of the network over communication performance of the access point.

EC100) The system of EC99 wherein the centralized resource is a server.

EC101) The system of EC99 wherein the centralized resource is another access point enabled to operate in the network.

EC102) A method comprising:
evaluating communication conditions local to an access point;
operating the access point in a network in accordance with a channel assignment that is a function of the evaluating; and
wherein the channel assignment is directed to prioritize overall communication performance of the network over communication performance of the access point.

EC103) A computer readable medium having a set of instructions stored therein that when executed by a processing element causes the processing element to perform functions comprising:
evaluating communication conditions local to an access point;
operating the access point in a network in accordance with a channel assignment that is a function of the evaluating; and
wherein the channel assignment is directed to prioritize overall communication performance of the network over communication performance of the access point.

EC104) A system comprising:
means for computing topological metrics based at least in part on communication topology of a plurality of access points enabled to participate in a network; and
means for determining, based at least in part on the topological metrics, assignments of channels to each of the access points.

EC105) A system comprising:
a plurality of access points enabled to operate in a network;
a centralized resource; and
wherein the centralized resource is enabled to receive topological metrics computed based at least in part on communication topology of the access points and to determine, based at least in part on the topological metrics, assignments of channels to each of the access points.

EC106) The system of EC105 wherein the centralized resource is a server.

EC107) The system of EC105 wherein the centralized resource is one of the access points.

EC108) A computer readable medium having a set of instructions stored therein that when executed by a processing element causes the processing element to perform functions comprising:
computing topological metrics based at least in part on communication topology of a plurality of access points enabled to participate in a network; and
determining, based at least in part on the topological metrics, assignments of channels to each of the access points.

EC109) A system comprising:
means for evaluating communication performance of a network of access points assuming proposed assignments of channels to the access points;
means for determining a communication performance metric at least in part by computing an average number of access point neighbors of each of the access points; and wherein the means for evaluating is based at least in part on the means for determining.

EC110) A computer readable medium having a set of instructions stored therein that when executed by a processing element causes the processing element to perform functions comprising:

evaluating communication performance of a network of access points assuming proposed assignments of channels to the access points;

determining a communication performance metric at least in part by computing an average number of access point neighbors of each of the access points; and wherein the evaluating is based at least in part on the determining.

Overview of Assignments of Channels

FIG. 1 illustrates selected details and operating context of an embodiment of wireless access points that are enabled to operate in a network according to assignments of channels. More specifically, APs 100-1, 100-2, 100-3, 100-4, and 100-5 are enabled to participate in Network 1000. An example assignment of channels is illustrated, with AP1 assigned to channel 1 (ch1), AP2 assigned to channel 2 (ch2), AP3 assigned to channel 3 (ch3), AP4 assigned to channel 3 (ch3) and AP5 assigned to channel 1 (ch1).

Each of the APs is enabled for communication with optional Central Server 500, as illustrated by couplings to the Central Server 300-1, 300-2, 300-3, 300-4, and 300-5. In some embodiments, one or more of the couplings to the Central Server are wired, such as Ethernet cables, and in some embodiments one or more of the couplings are wireless, such as via 802.11-compatible radios. The network is enabled for communication with Internet 800, as exemplified by couplings to Internet 400-1 and 400-2. Similar to the couplings to the Central Server, in various embodiments some of the couplings to the Internet are wired (such as Ethernet) and some of the couplings are wireless (such as 802.11 radios). In some embodiments, all APs of a network have a linkage to the Internet. A portion of the APs are illustrated as being in communication with clients, specifically AP4 with Laptop 600-1 (via channel 3 as illustrated by 200-1), and AP5 with Laptop 600-2 (via channel 1 as illustrated by 200-2). The figure is an example only, as embodiments with any number of APs, each enabled to operate on any number channels, with any number of clients, are possible.

Assignments of channels to various APs in a network (such as APs 100-1, 100-2, 100-3, 100-4, and 100-5 participating in Network 1000 of FIG. 1) are directed to balance communication performance of the network of the APs against locally optimal channel assignments for any one of the APs individually.

Figure 2:
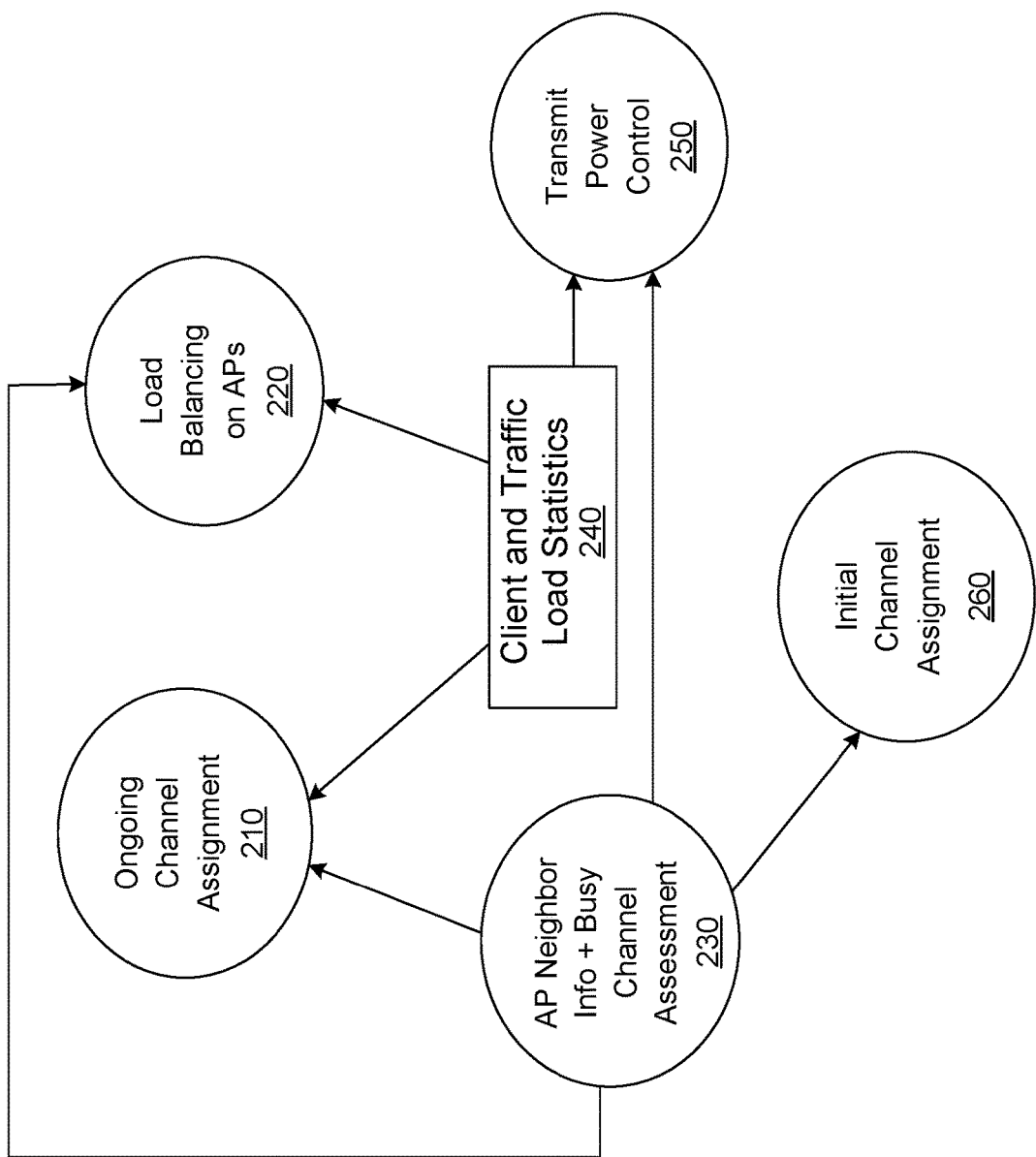
FIG. 2 illustrates selected conceptual aspects of operation of an embodiment of assignments of channels to access points.

FIG. 2 illustrates selected conceptual aspects of operation of an embodiment of assignments of channels to APs. In a network of APs, a starting assignment of channels is performed ("Initial Channel Assignment" 260) based on an initial determination of operating conditions, such as neighbor and channel evaluation ("AP Neighbor Info+Busy Channel Assessment" 230). Subsequently, channel assignments are recomputed, wholly or in part, such as in response to changes in numbers of APs in the network, interference sources, or traffic load ("Ongoing Channel Assignment" 210). Optionally, clients are spread across the APs of the network (by controlling which APs the clients associate with) to form a more even distribution ("Load Balancing on APs" 220). In some embodiments and/or usage scenarios, it is possible for a client to simultaneously communicate via two or more APs of a network, and the client and the network collaborate to share or balance load traffic between the two or more APs. Communication ranges of APs are balanced with interference between APs by adjusting power output levels ("Transmit Power Control" 250). Information and statistics concerning communication provided by the network is gathered and collected ("Client and Traffic Load Statistics" 240) and used to influence assignments of channels over time and to balance load across the APs of the network. In some embodiments, the initial operating condition determination also controls transmit power.

The following pseudo-code is representative of processing performed in some embodiments.

```
Start:
    Collect AP operating context information (neighbors,
        channel assessment)
    Determine initial channel assignments as function of
        (context information)
    Communicate channel assignments to APs
Loop:
    Operate network and collect AP operating information
        (number of clients, traffic load)
    Reassign channels as function of (collected operating
        information, objectives such as AP client load
        balancing)
    Determine transmit power as function of (collected
        operating information)
    Communicate new channel assignments and transmit
        power to APs
    GoTo Loop
```

Note that in some embodiments, the channel assignments are determined locally to each AP, and thus are automatically known to the APs without explicit communication.

The following is a conceptual description of an embodiment of assigning channels to APs of network. Processing begins with each AP evaluating conditions on each channel and computing local availability of each of the channels. Each respective one of the APs listens on a respective one of the channels and records a fraction of time that the respective channel is busy with transmissions or emissions. The respective AP records receptions errors, as the errors possibly indicate presence of interferers. Interferers include devices with signals that are not decodable by the respective AP (such as devices that are too far away or are encoded in a manner unknown to the respective AP). Interferers further include devices having emissions that are side effects not intended to convey information (such as microwave ovens).

In some usage scenarios, one or more channels are too busy (such as due to communication traffic and/or interference) or have too many errors, and are "blacklisted" at a particular one of the APs. Subsequent processing avoids assigning the blacklisted channels to the particular AP. Each of the APs develops a respective blacklist, as appropriate, and the subsequent assigning is in accordance with the respective blacklist for each of the APs. In some embodiments, blacklisting "expires" after a period of time, and a previously blacklisted channel is removed from a blacklist for a particular AP, thus becoming available for assignment to the particular AP. The expiration of blacklisting enables using channels that become less busy and/or less interfered with over time.

Processing continues with each AP scanning (passively, actively, or both) to detect neighbor APs, in any combination of internal/external neighbors or one-/two-hop neighbors, according to various embodiments. A respective address and signal strength is recorded for each of the neighbor APs. Passive scanning includes listening for control or data traffic from other APs. Active scanning includes sending one or more probe packets to solicit a response from any APs that have overhead the probe packet. In some embodiments, classifying an AP as a neighbor is dependent on signal levels during transmission of packets. For example, a two-hop (internal) neighbor with a relatively low signal level for packets sent along the two hops, is not classified as a neighbor, since interference is less likely due to the relatively low signal level. For another example, a two-hop (internal) neighbor with a relatively high signal level for packets sent along the two hops, is classified as a neighbor, since interference is more likely due to the relatively high signal level.

Processing further continues with each one of the respective APs collecting network usage information and/or statistics for the respective AP. For example, a respective one of the APs records how many clients are being served by the respective AP over time and how much traffic is sent and/or received for the clients over time. The other APs record similar information.

Subsequent processing formulates one or more assignments of channels to all or portions of the APs of the network, based on any combination of the conditions evaluated, the neighbors detected, and the usage information and/or statistics collected by each of the APs. In some usage scenarios, assignments of channels to APs are made over time, and in some instances are improved over time as more information is collected. For example, an initial assignment of channels to a particular AP of a network is made, followed by an improved assignment of channels to the particular AP. The improved assignment of channels relies, in part, on usage information for the particular AP that is collected in a period of time after the initial assignment of channels is made.

Changes to channel assignments are, in some embodiments, event driven, thus reducing interruptions or disruptions in network services. Example events are an explicit request, such as by a network administrator, an AP entering or exiting the network, or a relatively large change (either increase or decrease) in number of clients, traffic load, or interference on one or more APs.

Changes to assignments of channels of one or more APs in an operating network are localized, in some embodiments. For example, when a new AP joins an operating network, changes to channel assignments (and computation relating thereto) are restricted to channels assigned to the new AP, or alternatively channels assigned to or affected by the new AP. For another example, when a network administrator explicitly reassigns a particular AP to a new channel (such as in response to the particular AP reporting a currently assigned channel as over or heavily loaded), changes in channel assignment are restricted to the particular AP. For another example, when an AP requests a channel reassignment due to a degradation in operating conditions for a currently assigned channel, only the requesting AP receives a new channel assignment.

In various embodiments, channel assignments are performed in a network where one or more APs of the network operate with predetermined assignments, and channel assignments are computed according to the predetermined assignments. For example, a particular AP of a network is operable on only a particular channel, and channel assignments for other APs of the network are in accordance with the particular AP being restricted to operating on only the particular channel.

In some embodiments, channel assignments are computed by a centralized resource (such as an AP or a server), based at least in part on conditions evaluated, neighbors detected, and usage information and/or statistics collected by all APs of a network. The centralized resource takes into account conditions across the network as a whole, such as the information from all of the APs, optionally providing preferential assignments of channels to APs accordingly. For example, preferential assignments are optionally provided to APs that are in higher demand or are busier (such as due to relatively more clients and/or relatively higher traffic loads). For another example, preferential assignments are optionally provided to APs that that have relatively more neighbors or are operating on channels that are relatively higher loaded or busier.

In some embodiments, channel assignments are computed locally by each respective AP using conditions evaluated, neighbors detected, and usage information and/or statistics collected by the respective AP, optionally supplemented with information from neighbor APs of the respective AP.

Inputs to Computation of Channels

A channel preference list is developed for each AP in a network. The preference list for a particular AP is a sorted list of all channels that the particular AP is enabled to communicate with on the network. The sorting is according to one or more channel metrics, such as relative load, so that relatively more lightly loaded channels are higher on the preference list than relatively more heavily loaded channels. Channel load is measured, for example, by a fraction (or normalization) of time a channel is busy such that an AP would be unable to begin transmitting. For another example, channel load is measured as a quantity or severity of error conditions detected on a channel. For other examples, channel load is measured with respect to communication quality on the channel, or signal strength, such as that of traffic sent by a neighbor AP. When a particular channel is loaded beyond a threshold, then the particular channel is optionally blacklisted and thus excluded from being assigned. The blacklisting optionally expires after a period of time, with the period of time optionally increasing when a channel is blacklisted repeatedly.

In some embodiments, information to formulate the preference lists is communicated to a centralized resource, and the central resource formulates the information into (sorted) channel preference lists for APs. In some embodiments, each respective AP locally formulates a respective channel preference list, and the preference lists are optionally communicated to a centralized resource.

AP neighbor information is developed for each AP by setting all APs of a network to transmit, at maximum power, on a same channel. The APs then scan (actively or passively, as described elsewhere herein) for neighbors. Internal neighbors are distinguished from external neighbors by information provided in control messages. In some embodiments, two-hop neighbor information is developed locally by the APs, while in some embodiments two-hop neighbor information is developed by a centralized resource, based on one-hop neighbor information received from the APs. In some operating environments and/or usage scenarios, interference caused by two-hop neighbors is unpredictable and difficult to calculate accurately, as the interference depends on propagation conditions, locations of APs and clients, transmit powers, and noise levels at various devices. In some embodiments, an estimate for two-hop interference is based in part on received signal measurements across the individual hops of the two-hop link. In some embodiments, interference estimation (such as for two-hop interference) is based in part on absolute and/or relative location information (e.g. GPS data), optionally in conjunction with the signal measurements.

Computation of Assignments of Channels

A description of embodiments of techniques to determine assignments of channels for each of a plurality of APs enabled to participate in a network follows. The description is conceptual in nature, and other embodiments are contemplated. The technique begins by initializing to empty a bin for each channel that is assignable. As an AP is assigned to a channel, the AP is conceptually placed into the bin for the channel. In some situations, several APs are assigned to a single channel, and if so assigned, then the bin for the single channel holds the several APs. After the initializing, each (if any) of the APs with a fixed or preconfigured channel assignment is placed into the bins according to the fixed or preconfigured channel assignment. For example, consider a network with three APs and three assignable channels. The first AP is fixed to a first channel, the second AP is preconfigured to a second channel, and the third AP is enabled to use any of the three channels. The first AP is placed in the first bin, the second AP is placed in the second bin, and the third AP is, as yet, not placed in any of the bins, so the third bin is empty. In some usage scenarios, APs with fixed or preconfigured channel assignments are APs with disabled channel assignment, or manually specified or set channel assignment.

The unassigned APs (APs not yet assigned to a channel and thus not yet in any of the bins) are then sorted according to a non-increasing order based on one or more factors. For example, sorting is first performed on a first factor, and ties are broken by examining a second factor. Further ties are broken by examining a third factor, and so forth. In some embodiments, equality is considered a tie, while in other embodiments, equality within a certain threshold, fraction, or percentage is considered a tie. Example factors are number of various classes of APs, such as neighbor APs (without regard to internal/external or number of hops), internal neighbor APs (without regard to number of hops), external neighbor APs, one-hop (internal) neighbor APs, and two-hop (internal) neighbor APs. Further example factors are number of clients on an AP and traffic load (e.g. rate of packets communicated per unit time) via an AP.

While there are unassigned APs among the sorted APs, the first of the sorted APs is selected and assigned to a chosen one of the assignable channels (and placed in the bin corresponding to the chosen channel). The chosen channel is chosen such that assigning the selected AP to the chosen channel is expected to result in communication performance that is higher than assigning the selected AP to any other of the assignable channels. The communication performance is evaluated individually with respect to each of the assignable channels, with the chosen channel being selected based on all of the evaluations, and thus the communication performance is with respect to all of the assignable channels. Each of the evaluations of an individual one of the channels is collectively with respect to the selected AP and all of the other APs already assigned to the individual channel being evaluated, with the communication performance corresponding to a hypothetical network formed of the collective APs. In some embodiments, any of the assignable channels that are blacklisted by a particular one of the APs are not assigned to the particular AP.

When there are no remaining unassigned APs among the sorted APs, the assignments of channels is complete. Each of the bins now holds all of the APs to be assigned the channel corresponding to the respective bin. The assignments of channels are then communicated to the APs, and the APs are then operated as a network according to the assignments of channels.

Communication Performance Evaluation

A description of embodiments of evaluating the communication performance of a hypothetical network follows. In some usage scenarios, the following is performed for all assignable channels of a collection of APs enabled to operate as a network. The evaluation of the communication performance of a particular channel that is being considered for assignment to a particular AP begins by counting how many one-hop (internal) neighbor APs there are for each of the APs currently assigned to (or assumed to be assigned to) the particular channel, including the particular AP the computation is being performed for. The counts are then averaged to a single value termed "N1".

The evaluation continues by counting how many two-hop (internal) neighbor APs there are for each of the APs currently assigned to (or assumed to be assigned to) the particular channel, including the particular AP the computation is being performed for. The counts are then averaged to a single value termed "N2".

The evaluation continues by counting how many external neighbor APs there are for each of the APs currently assigned to (or assumed to be assigned to) the particular channel, including the particular AP the computation is being performed for. The counts are then averaged to a single value termed "N3".

The evaluation continues by counting how many neighbor APs there are for each of the APs currently assigned to (or assumed to be assigned to) the particular channel, including the particular AP the computation is being performed for. A standard deviation, termed "S1", is then determined for the counts. The counts include internal (both one-hop and two-hop) neighbors as well as external neighbors.

Note that the various neighbor counts are with respect to the particular channel. For example, the one-hop (and external) neighbors are with respect to a single wireless hop via the particular channel. For another example, the two-hop neighbors are with respect to two wireless hops, both via the particular channel.

The evaluation of the communication performance of the particular channel and the particular AP completes by weighting the averaged counts as a so-called Neighbor Impact Metric, or NIM, e.g.:

$$NIM = w1 \times N1 + w2 \times N2 + w3 \times N3; \text{ where}$$

$$w1 + w2 + w3 = 1.$$

The weights (w1, w2, and w3) are chosen according to usage scenario and embodiment. Example values are 0.5, 0.3, and 0.2, respectively, for w1, w2, and w3. In some embodiments and/or usage scenarios, providing separate weights for N1 and N2 enables better approximation of interference effects of two-hop neighbors in comparison to one-hop neighbors or other sources of interference. In some embodiments and/or usage scenarios, setting w3 to a lower value than w1 and w2 prevents external neighbors from having a relatively large influence on channel assignment, providing a benefit in some situations since the external neighbors are not subject to controls provided by and are not well known by the network.

After the respective communication performance for each of the assignable channels has been evaluated according to the above, a chosen channel for the particular AP is determined by selecting the channel that the NIM is the lowest for, as reduced neighbor impact is expected to result in higher communication performance of a network. If more than one of the channels has the lowest NIM, then ties are broken according to channel preference(s) of the particular AP. For example, if the NIM computed for two channels is identical, then the AP is assigned the one of the two channels that is ranked higher in the preference list of the AP. Further tie breaking, according to various embodiments, uses number of APs on channels (e.g. choose a channel having fewer APs), S1 (e.g. choose a channel having a lower standard deviation), or both.

In some embodiments, the N1 (or N2, N3, or S1) value is a metric (or is a basis for a metric) that is representative of communication topology (e.g. "neighbor-ness") and thus is conceptually a topological (communication) metric. In some embodiments, when a new AP appears (such as by being switched on, becoming operational, or moving into range of a network), computations relating to N1 (or N2, N3, or S1) are reduced by computing only with respect to the APs that are appropriate neighbors of the new AP. For example, only computations for APs that are within a single wireless hop of the new AP are performed when computing N1. For another example, only computations for APs that are two wireless hops away from the new AP are performed when computing N2.

In various usage scenarios, the hypothetical network being evaluated corresponds to a physical network, or a proposed or hypothesized network. For example, the hypothetical network corresponds to a physical network that is operating according to existing assignments of channels to APs. For another example, the hypothetical network corresponds to a physical network that assignments of channels are being recomputed for due to one or more changes in AP operating context (such as number of clients or traffic load), mode (such as being switched on or off), or AP location. For another example, the hypothetical network corresponds to a proposed network under consideration in isolation or for comparison to another network. For another example, the hypothetical network corresponds to a hypothesized network that is a variation of an existing or previously evaluated physical network.

In some usage scenarios, a network is operated for enough time and under appropriate conditions to collect operational statistics (such as number of clients, traffic load, or time busy sending and/or receiving) with respect to one or more APs of the network. The operational statistics are collected over one or more time intervals and optionally summarized. In some embodiments, the operational statistics (or summaries thereof) are referenced when evaluating the communication performance. The reference to the operational statistics enables assigning channels so that preference is given to APs that are more highly utilized (such as having a relatively larger number of clients, a relatively higher traffic load, or relatively more time busy sending/receiving).

As previously described, N1, N2, N3, and S1 are computed by counting each AP of an appropriate type of neighbor as one. In some alternate embodiments where operational statistics are collected, N1, N2, N3, and S1 are instead computed by counting each AP of an appropriate type of neighbor as a value that varies according to a weighted sum of a constant and a measure of how utilized the AP being counted is. The measure of utilization is a function of the operational statistics. For example, in some alternate embodiments, the value (to count each AP as) is computed as:

$$\text{Effective\_AP\_Count} = w4 \times 1 + w5 \times \text{Num\_Clients} + w6 \times \text{Traffic\_Load; where}$$

$w4$ is a base weight,
Num_Clients is how many clients the AP being counted has (optionally normalized), and Traffic_Load is how much communication the AP is participating in (such as traffic load measured in, for example, packets per unit time, or such as time the AP is busy sending and/or receiving) (optionally normalized).

Example values of weights $w4$, $w5$, and $w6$, are, respectively, 0.5, 0.3, and 0.2.

The Effective_AP_Count tends to bias NIMs computed for APs having highly utilized neighbor APs higher than APs not having so highly utilized neighbor APs. The higher NIMs in turn result in lower priority for selection for channel assignment (as the choice of channel assignment is according to lowest NIM), thus resulting in the highly utilized neighbor APs being impacted less (or not being additional impacted) by each channel assignment compared to using a count value of one.

Channel Reassignment Over Time

Channels are optionally or selectively reassigned over time, based on information gathered, collected, or tracked across a network over time and/or summaries or averages thereof. For example, the aforementioned operational statistics are periodically sampled and the samples are used to periodically reassign channels to one or more APs in a network. For another example, one or more channel metrics used to formulate an AP preference list (or the preference list itself) are gathered, collected, or tracked over time, and used to reassign channels to one or more APs in a network. Reassigning channels over time enables dynamic tracking of channel assignment according to usage of the network, and also enables improving channel assignment over time as more information about the network and environment the network is operating in become known.

Centralized and Distributed Channel Assignment

Control of and computations relating to channel assignment vary according to embodiment, with some embodiments being characterized as relatively centralized while other embodiments are characterized as relatively distributed. In some centralized embodiments, a centralized resource (such as a designated or preselected AP of a network, or a server) receives information from all APs of the network, and then computes and communicates the assignments of channels. Examples of the received information include number and type of neighbor APs of APs that are internal to the network as well as APs that are external to the network. In some centralized embodiments, the centralized resource computes preference lists for each AP of a network, while in other centralized embodiments, each AP computes a respective preference list to provide to the centralized resource.

In some distributed embodiments, each AP (independently) performs portions or variations of the computations relating to assignment of channels for the respective AP, subject to only information known directly by the respective AP or obtainable from neighbor APs of the respective AP. Examples of information known by the respective AP include channel metrics used to formulate a preference list for the respective AP, and the preference list. Examples of information obtainable from the neighbor APs include client and traffic statistics, such as per channel.

AP Hardware

Figure 3:
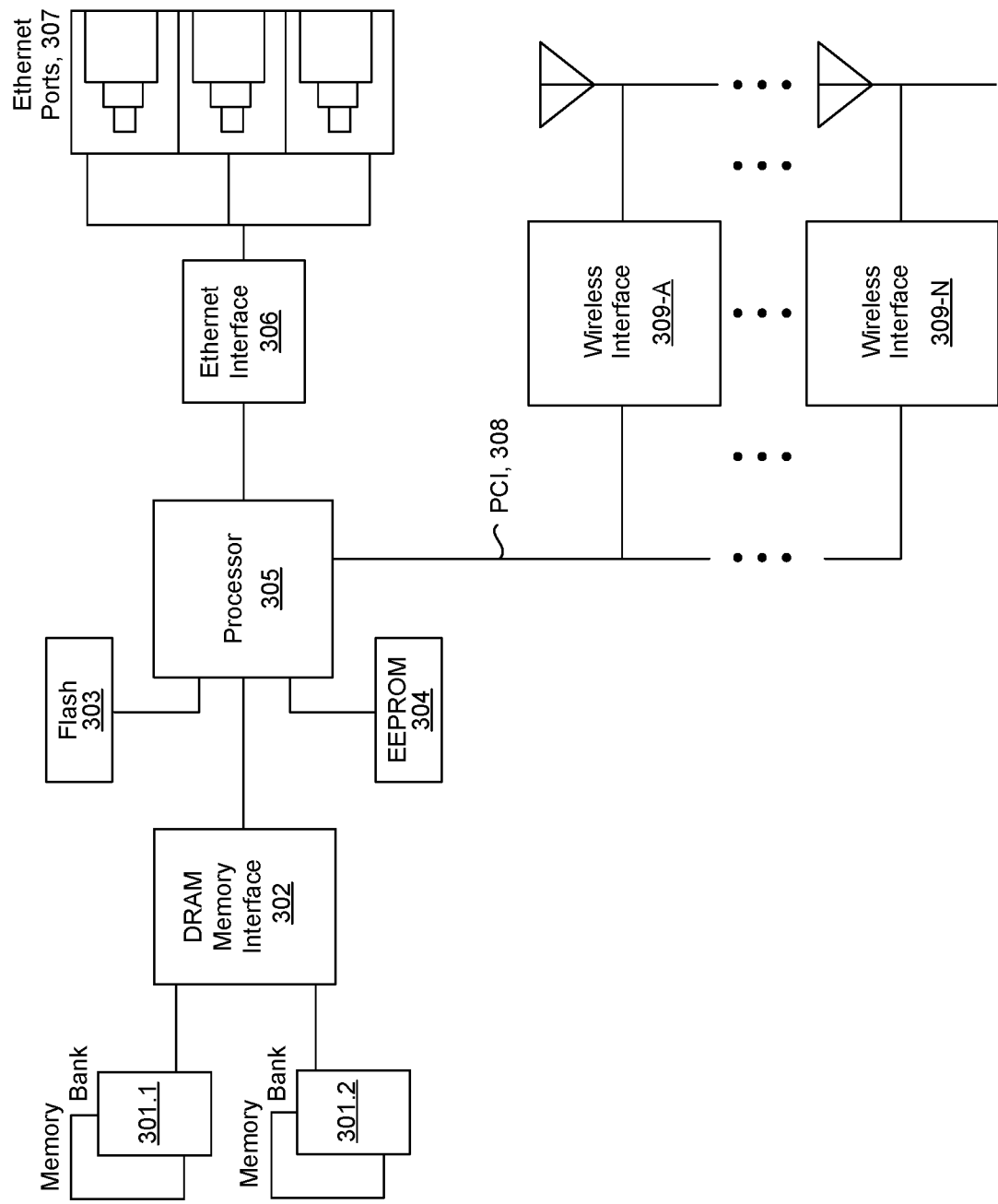
FIG. 3 illustrates selected details of hardware aspects of an embodiment of an access point.

FIG. 3 illustrates selected details of hardware aspects of an embodiment of an AP, such as any of APs 100-1, 100-2, 100-3, 100-4, and 100-5 of FIG. 1. The illustrated AP includes Processor 305 coupled to various types of storage, including volatile read/write memory "Memory Bank" elements 301.1-2 via DRAM Memory Interface 302, and non-volatile read/write memory Flash 303 and EEPROM 304 elements. The processor is further coupled to Ethernet Interface 306 providing a plurality of Ethernet Ports 307 for establishing wired links, and Wireless Interfaces 309-9 and 309-N providing radio communication of packets for establishing wireless links. The wired links provide communication between the illustrated AP and, for example, other APs or a centralized resource. The wireless links provide communication between the illustrated AP and, for example, another AP and/or a client of the illustrated AP. In some embodiments, some of the Wireless Interfaces are compatible with an IEEE 802.11 wireless communication standard (such as any of 802.11a, 802.11b, 802.11g, and 802.11n). In some embodiments, one or more of the Wireless Interfaces operate (in conjunction with any combination of hardware and software elements of the AP) to collect channel metrics (such as used in part to determine a preference list), and to collect information used in part to determine the assignment of channels. In some embodiments, one or more of the Wireless Interfaces operate in accordance with the aforementioned assignment of channels. In some embodiments, one or more of the Wireless Interfaces are configurable to drop all packets below a settable Received Signal Strength Indicator (RSSI) threshold. The illustrated partitioning is only one example, as other equivalent embodiments of an AP are possible.

In operation, the processor fetches instructions from any combination of the storage elements (such as DRAM, Flash, and EEPROM) that operate as computer readable media, and executes the instructions. Some of the instructions correspond to software associated with operating the AP to collect the channel metrics and the information used for the assignment of channels. Some of the instructions correspond to software associated with operating the AP in accordance with the assignment of channels. In various embodiments, some of the instructions correspond to software associated with centralized and/or distributed channel assignment. In some embodiments, some of the instructions correspond to all or any portion of software illustrated in FIG. 4, such as NMS Manager 401, Ethernet Driver 414, and Radio Driver 415.

AP Software

Figure 4:
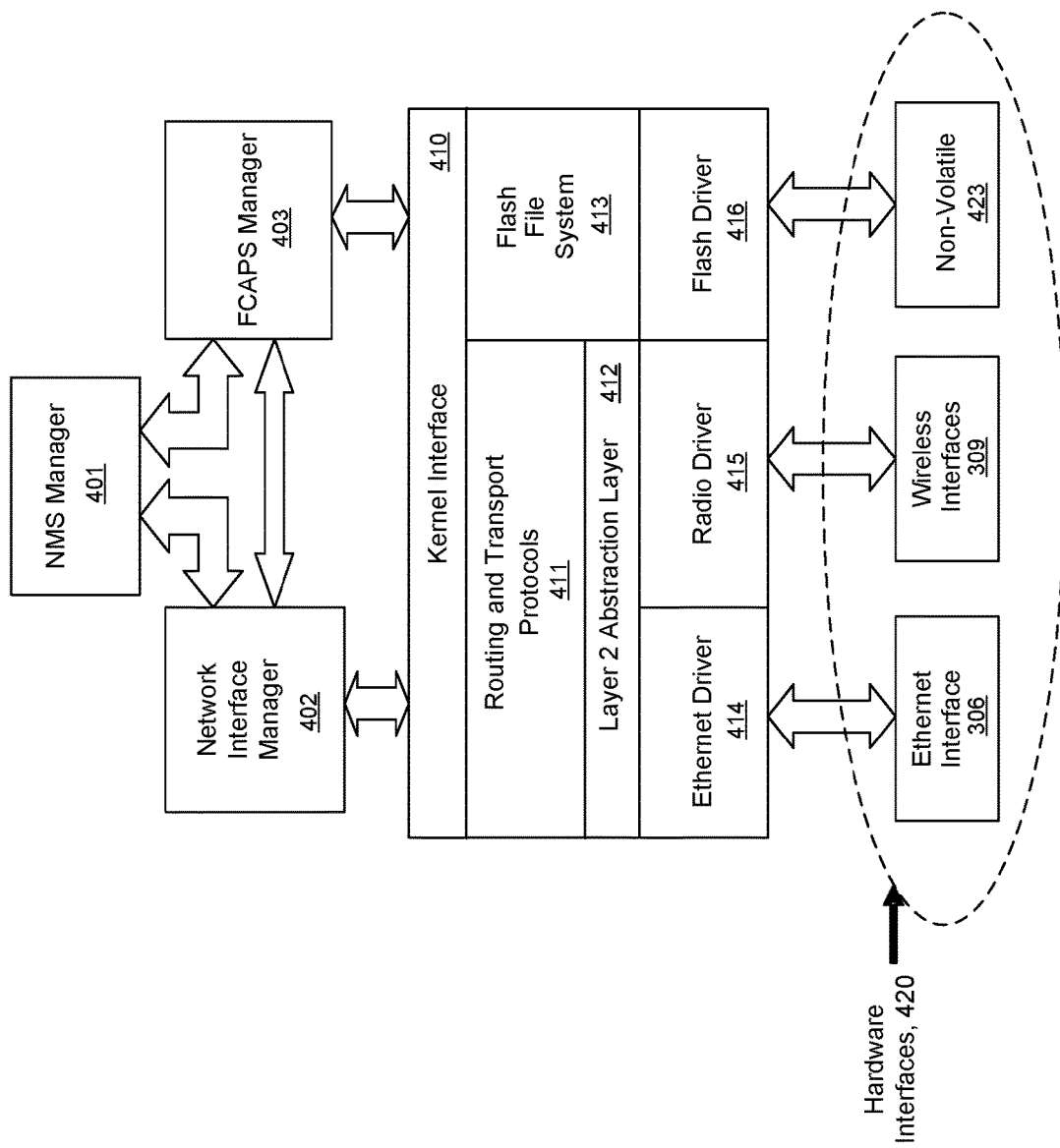
FIG. 4 illustrates selected details of software aspects of an embodiment of an access point.

FIG. 4 illustrates selected details of software aspects of an embodiment of an AP, such as any of APs 100-1, 100-2, 100-3, 100-4, and 100-5 of FIG. 1. Various software modules are illustrated in a context that conceptually illustrates AP communication and connectivity capability as Hardware Interfaces 420. The illustrated software includes NMS Manager 401 interfacing to Network Interface Manager 402 and FCAPS Manager 403. In some embodiments, the NMS interfaces between management software operating external to the AP and software operating internal to the AP (such as various applications and FCAPS). The Network Interface Manager manages physical network interfaces, such as the Ethernet and Wireless Interfaces of an AP, as illustrated by Ethernet Interface 306 (also illustrated in FIG. 3) and Wireless Interfaces 309 (representative of Wireless Interfaces 309-A . . . 309-N of FIG. 3). The Network Interface Manager assists the NMS in passing dynamic configuration changes (as requested by a user) through the management software to FCAPS. In some embodiments, FCAPS includes functions to store and retrieve configuration information, and FCAPS functions serve all applications requiring persistent configuration information. FCAPS optionally assists in collecting fault information and statistics and performance data from various operating modules of the AP. FCAPS selectively passes any portion or all of the collected information, statistics, and data to the NMS.

Kernel Interface 410 interfaces the Managers to Routing and Transport Protocols layer 411 and Flash File System module 413. The Transport Protocols include TCP and UDP. The Flash File System module interfaces to Flash Driver 416 that is illustrated conceptually coupled to Non-Volatile hardware element 423 that is representative of a flash file system (e.g. data organized in a non-volatile memory) stored in any combination of Flash 303 and EEPROM 304 elements of FIG. 3. Layer-2 Abstraction Layer 412 interfaces the Routing and Transport Protocols to Ethernet and Radio Drivers 414 and 415, respectively. The Ethernet Driver is illustrated conceptually coupled to Ethernet Interface 306 of FIG. 3. The Radio Driver is illustrated conceptually coupled to Wireless Interfaces 309 that is representative of the Wireless Interfaces 309-A . . . 309-N of FIG. 3. In some embodiments, the software includes a serial driver. The software is stored on a computer readable medium (e.g. any combination of the DRAM, Flash, and EEPROM elements), and is executed by a programmable element, such as Processor 305 of FIG. 3. The illustrated partitioning is an example only, as many other equivalent arrangements of layers are possible.

In various embodiments, any combination of all or portions of software relating to operating the AP to collect channel metrics and information used for the assignment of channels, operating the AP in accordance with the assignment of channels, and centralized and/or distributed channel assignment, is included in any combination of NMS Manager 401, Ethernet Driver 414, Radio Driver 415, and other software modules not explicitly illustrated in FIG. 4.

Conclusion

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as protocol standards; communication standards; networking technologies; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design comprise insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    computing a neighbor impact metric corresponding to a particular access point in a wireless network of access points;
    assigning channels to the access points based at least in part on results of the computing;
    operating at least the particular access point in accordance with the assigned channels;
    wherein the neighbor impact metric is in accordance with a quantity of one-hop neighbors of the particular access point, a quantity of two-hop neighbors of the particular access point, and a quantity of neighbors not part of the wireless network; and
    wherein the neighbor impact metric is in accordance with traffic load on the access points.

2. The method of claim 1, wherein the quantity of one-hop neighbors is in accordance with counting each one-hop neighbor as a constant value.

3. The method of claim 1, wherein the quantity of one-hop neighbors is in accordance with counting each one-hop neighbor as a function of operational statistics of the respective one-hop neighbor.

4. The method of claim 3, wherein the operational statistics comprise traffic load.

5. The method of claim 1, wherein the quantity of two-hop neighbors is in accordance with counting each two-hop neighbor as a constant value.

6. The method of claim 1, wherein the quantity of two-hop neighbors is in accordance with counting each two-hop neighbor as a function of operational statistics of the respective two-hop neighbor.

7. The method of claim 6, wherein the operational statistics comprise traffic load.

8. The method of claim 1, wherein the quantity of neighbors not part of the wireless network is determined at least in part by examining information provided in control messages.

9. The method of claim 1, wherein the computing and the assigning channels are performed by the particular access point.

10. The method of claim 1, wherein the computing and the assigning channels are performed by a centralized resource.

11. A non-transitory machine-readable medium having a set of instructions stored therein that when executed by a processing element cause the processing element to perform functions comprising:
    computing a neighbor impact metric corresponding to a particular access point in a wireless network of access points;
    assigning channels to the access points based at least in part on results of the computing;
    operating at least the particular access point in accordance with the assigned channels;
    wherein the neighbor impact metric is in accordance with a quantity of one-hop neighbors of the particular access point, a quantity of two-hop neighbors of the particular access point, and a quantity of neighbors not part of the wireless network; and
    wherein the neighbor impact metric is in accordance with traffic load on the access points.

12. The non-transitory machine-readable medium of claim 11, wherein the quantity of one-hop neighbors is in accordance with counting each one-hop neighbor as a constant value.

13. The non-transitory machine-readable medium of claim 11, wherein the quantity of one-hop neighbors is in accordance with counting each one-hop neighbor as a function of traffic load of the respective one-hop neighbor.

14. The non-transitory machine-readable medium of claim 11, wherein the quantity of two-hop neighbors is in accordance with counting each two-hop neighbor as a constant value.

15. The non-transitory machine-readable medium of claim 11, wherein the quantity of two-hop neighbors is in accordance with counting each two-hop neighbor as a function of traffic load of the respective two-hop neighbor.

16. The non-transitory machine-readable medium of claim 11, wherein the quantity of neighbors not part of the wireless network is determined at least in part by examining information provided in control messages.

17. An apparatus comprising:
    a processor;
    a memory readable by the processor;
    a wireless interface;
    wherein the memory is enabled to store instructions that when executed by the processor enable the processor to perform functions comprising:

computing a neighbor impact metric corresponding to a particular access point in a wireless network of access points, assigning channels to the access points based at least in part on results of the computing, and operating the wireless interface in accordance with the assigned channels;

wherein the neighbor impact metric is in accordance with a quantity of one-hop neighbors of the particular access point, a quantity of two-hop neighbors of the particular access point, and a quantity of neighbors not part of the wireless network; and wherein the neighbor impact metric is in accordance with traffic load on the access points.

18. The apparatus of claim 17, wherein the quantity of one-hop neighbors is in accordance with counting each one-hop neighbor as a function of traffic load of the respective one-hop neighbor.

19. The apparatus of claim 17, wherein the quantity of two-hop neighbors is in accordance with counting each two-hop neighbor as a function of traffic load of the respective two-hop neighbor.

20. The apparatus of claim 17, wherein the quantity of neighbors not part of the wireless network is determined at least in part by examining information provided in control messages.

\* \* \* \* \*